No. 678,510. Patented July 16, 1901.
C. G. PAGE.
PNEUMATIC TIRE AND INNER TUBE THEREFOR.
(Application filed June 7, 1901.)
(No Model.) 2 Sheets—Sheet 1.
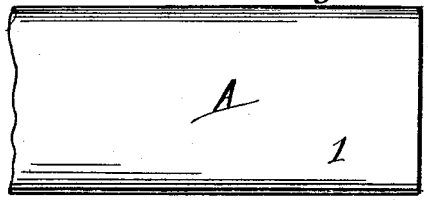
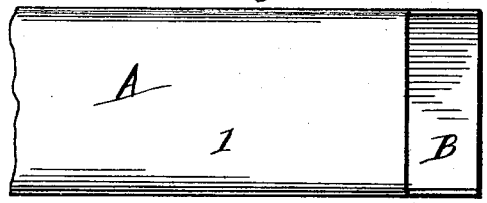
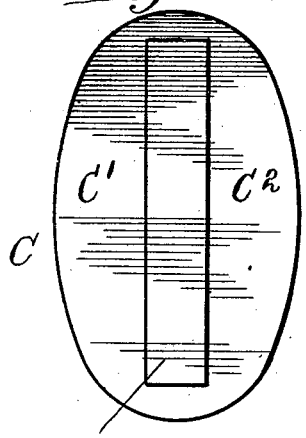
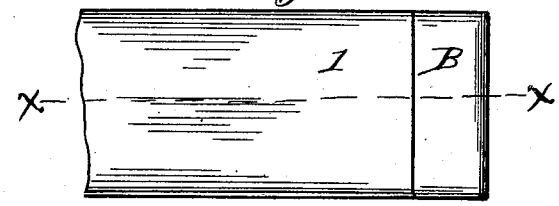
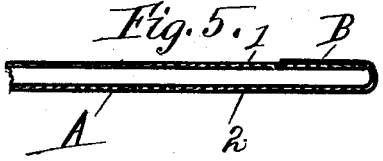
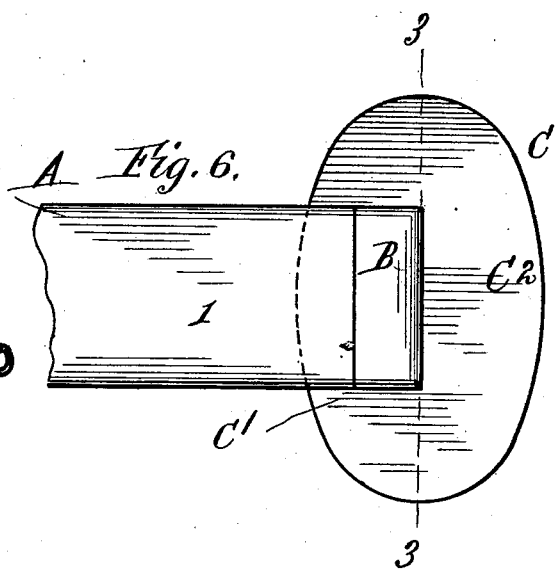
Witnesses:
A. F. Durand,
Ottilie C. Freiberg
Inventor:
Charles G. Page

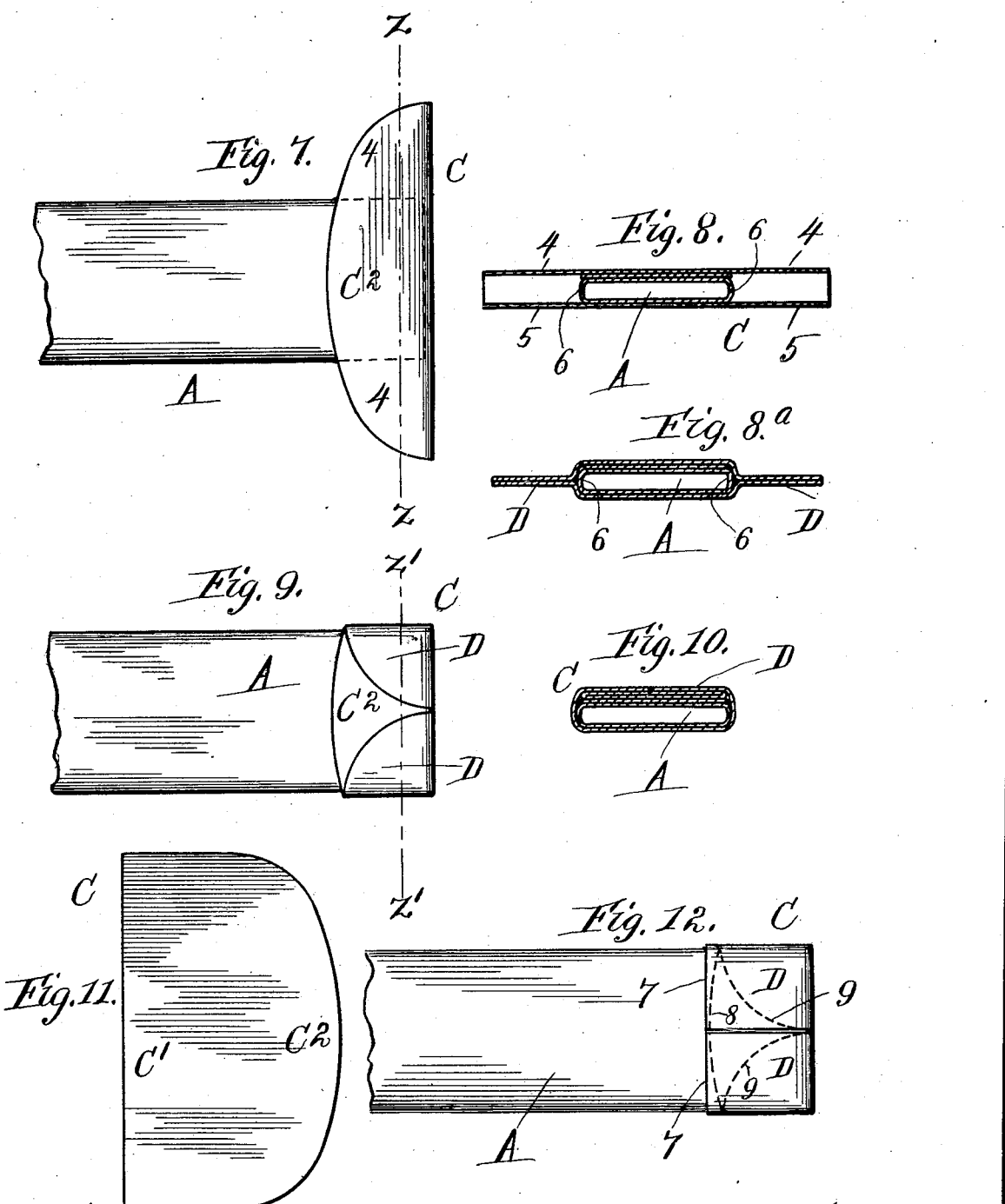

UNITED STATES PATENT OFFICE.

CHARLES G. PAGE, OF OAKPARK, ILLINOIS.

PNEUMATIC TIRE AND INNER TUBE THEREFOR.

SPECIFICATION forming part of Letters Patent No. 678,510, dated July 16, 1901.

Application filed June 7, 1901. Serial No. 63,602. (No model.)

*To all whom it may concern:*

Be it known that I, CHARLES G. PAGE, a citizen of the United States, residing at Oakpark, in the county of Cook, State of Illinois, have invented a certain new and useful Improvement in Pneumatic Tires and Inner Tubes Therefor, of which the following is a specification.

My invention relates to pneumatic tires of the class in which the tire sheath or casing contains a removable inflatable inner tube arranged within the casing, with one terminal portion of the tube lapping the opposite terminal portion of the tube.

Objects of my invention are to close and reinforce the tube in a way to oppose lateral spread at its corner portions; to permit a tube of cheap or compounded rubber to be closed by an elastic binding of high-grade rubber adapted to resist rupture when the tube is inflated; to permit the tube, when so desired, to be closed and vulcanized on a mandrel, and to provide a practical and effective way of closing the ends of the tubes by caps without involving the objectionable features of employing molded end caps.

In the accompanying drawings, Figure 1 represents the end portion of an inner tube for pneumatic tires of the double-tube type. Fig. 2 is a like view showing a portion of the tube cut away to form a flap. Fig. 3 shows a binding-piece. Fig. 4 shows the flap of Fig. 2 folded back. Fig. 5 is a section on line $xx$ in Fig. 4. Fig. 6 shows the tube portion of Fig. 4 laid on the binding-piece. Fig. 7 shows the binding-piece folded back. Fig. 8 is a section on line $zz$ in Fig. 7 before the side portions of the folded binding-piece in Fig. 7 are brought together. Fig. $8^a$ is a like view showing portions of the piece C united to form flanges or webs. Fig. 9 shows the side portions or flaps of the binding-piece over upon one side of its middle portion. Fig. 10 is a section on line $z'z'$ in Fig. 9. Fig. 11 shows a slightly different form of binding-piece. Fig. 12 illustrates the application of the binding-piece of Fig. 11 to the end portion of a tube.

Referring to the figures of said drawings up to and including Fig. 10, A indicates an end portion of an inflatable inner tube understood to be provided with any suitable valve device and to be adapted for use as an inner tube in a double-tube tire after its ends have been closed.

In Fig. 2 a portion of the side 1 of the tube is cut away, so as to adapt the opposite side 2, Fig. 5, of the tube to provide a projecting flap B. This flap can be folded back upon and united to side 1 of the tube, as in Figs. 4, 5, and 6. With such arrangement the flap B will serve to close the end of the tube except at the end corners. In order to reinforce the flap B and to close the tube at its end corners, so as to avoid rupture under inflation, I provide a combined sealing and binding piece C, which preferably consists of a sheet of high-grade rubber adapted to stand all usual strain without rupture. An end portion of the tube is then laid upon this sealing and binding piece, as in Fig. 6, so as to permit the union of a portion of side 2 of the tube with a portion of such sealing and binding piece, the terminal of the tube being placed on or near the line 3 3 in Fig. 6. By this arrangement the piece C will, in effect, form two flaps, whereof the one flap C' can be united to the side 2 of the tube, while the other flap $C^2$ can be folded substantially along the line 3 3 and brought over upon and united both to side 1 of the tube and to flap B, which practically forms a continuation of such side 1. The piece C thus folded, so as to embrace the end of the tube between the flaps or portions C' $C^2$, is illustrated in Figs. 7 and 8. With this arrangement the piece C will serve to reinforce the portion of flap B which closes the end of the tube, except at the end corners of the latter. In order to complete the cap, and thereby effectively seal up the tube at its end corners, and to reinforce the edge portions of the tube to a desirable extent back from its terminals, so as to resist lateral strain when the tube is inflated, the portions 4 of flap $C^2$ which project laterally from the tube in Figs. 7 and 8 are then united with the corresponding portions 5 of flap C', as in Fig. $8^a$. This can be readily accomplished by hand manipulation or by any suitable mechanical appliance adapted to bring together corresponding flap portions 4 and 5, it being observed that such union will cause the flap portions 4 and 5 to also unite with the edge portions 6 of the tube. In this way the air-chamber extends to the terminal of the tube, which is now, in effect, closed by a cap having laterally-projecting wings, webs, or flange portions D D, Fig. 8ª, formed by the union of the flap portions 4 with the flap portions 5. These laterally-projecting webs D are then folded over upon the tube structure and united thereto. One web or flange portion may be folded over upon one side and the other folded over upon the opposite side of the tube structure, or both of such flange portions can be folded upon and united to one side of the tube structure, as in Fig. 1, in which it will be seen that these flanges D are folded upon and united to the middle portion C² of the sealing-piece which forms a side portion of a closing-cap. By such arrangement the tube is effectively sealed, and the sealing-cap thus formed by folding and uniting the piece C is reinforced at points where reinforcement is desirable, and if it is desired to further reinforce the cap a supplemental or reinforcing piece E can, in the first instance, be placed upon the sealing-piece C, as in Fig. 3.

In Figs. 11 and 12 the cap is formed as hereinbefore described, with the exception that the piece C is cut so that its flap portion C' will be wider than its flap portion C², the result being that when the flanges D are folded over parts of the portions 5 of the flap portion C' will be united directly to the tube, as at 7, Fig. 12, in which dotted line 8 indicates the middle portion of the curved edge of flap C², Fig. 11, while dotted lines 9 indicate the remaining portions of such curved edge of flap C². The form of the piece C may therefore be varied without departing from the spirit of my invention, which contemplates the formation of a closing-cap upon the tube by folding and uniting a piece of rubber fabric. The flap B can also be dispensed with, and in such case the sealing and binding piece C can serve to entirely close the tube by forming a complete cap, reinforced substantially as described. In forming this cap the interior of the tube can be coated with soapstone, so as to avoid adherence of its opposing sides or walls, and the piece C can then be applied to form a cap, or the tube can be somewhat expanded by a mandrel, either flat or elliptic in cross-section, it being observed that by using a mandrel as an internal support for the tube the portions 4 and 5 of the sealing-piece can be pinched together close up to and against the portions of the tube on such mandrel, which latter will permit the use of pressure exerted in a direction to secure a firm union between the flap portions 4 and 5 and the edge portions 6 of the tube. In closing the ends of the tubes, as hereinbefore set forth, the meeting layers of fabric can be cemented together prior to or after vulcanization; but preferably the layers are united either by cementation or by the natural adhesive condition of the rubber prior to vulcanization. It is also understood that whether the flap B is employed or dispensed with the tube has an end cap-closure comprising fabric folded upon the end of the tube so as to form flaps, which are secured to opposite sides of the tube, the fabric being of a width to permit such flaps to project laterally from the tube, such projecting flap portions being united to form lateral webs or flanges which are folded over upon the tube and secured in place. Where flap B is employed, it is united to side 1, and thereby forms a part of such side. Also after flap C² is secured to side 1 of the tube it practically forms a part of said side.

It will also be seen that the foregoing construction of end closure involves a piece of rubber fabric folded to form two opposing flaps, whereof the end portions are united to practically form two integral webs, while the flap portions between such webs form a pocket or the body of the cap, which said cap has two webs D D. The end of the tube is united to the inner wall of this cap, whereof the end closes the open end of the tube.

What I claim as my invention is—

1. Closing the end of an inner tube for pneumatic tires by folding a piece of rubber fabric upon the end portion of the tube, the fabric being wider than the tube so as to form two flaps embracing the tube and projecting laterally therefrom; uniting the projecting end portions of such flaps to form lateral webs or flanges; and folding such flanges over upon the tube and securing them in such folded condition.

2. An inner tube for pneumatic tires having an end cap-closure comprising rubber fabric folded upon the end of the tube so as to form flaps which are secured on opposite sides of the tube, the fabric being of a width to permit such flaps to project laterally from the tube, and such projecting flap portions being united to form webs or flanges which are folded over upon the tube and secured in place.

3. An inner tube for pneumatic tires having a construction of end closure comprising a cap which is united with the tube by cementation, or vulcanization, or both, and which involves in its structure a piece of rubber fabric folded to form two opposite flaps which have their end portions united to form webs; the portions of such flaps between the webs being secured upon the end portion of the tube.

CHARLES G. PAGE.

Witnesses:
 OTTILIE C. FREIBERG,
 BERTHA M. STEINBERG.